United States Patent [19]
Armond

[11] Patent Number: 5,624,477
[45] Date of Patent: Apr. 29, 1997

[54] PRESSURE SWING ADSORPTION PLANTS

[75] Inventor: John W. Armond, Guildford, England

[73] Assignee: The BOC Group plc, Windlesham, England

[21] Appl. No.: 210,117

[22] Filed: Mar. 16, 1994

Related U.S. Application Data

[63] Continuation-in-part of Ser. No. 878,796, May 5, 1992, abandoned.

[30] Foreign Application Priority Data

May 9, 1991 [GB] United Kingdom ............... 9110038

[51] Int. Cl.$^6$ ........................................... B01D 53/047
[52] U.S. Cl. .................. 95/96; 95/117; 95/130; 95/139; 96/132; 96/154; 96/112
[58] Field of Search ............... 95/96, 117–119, 95/130, 139; 96/108, 121, 126–133, 154

[56] References Cited

U.S. PATENT DOCUMENTS

| | | | |
|---|---|---|---|
| 2,661,808 | 12/1953 | Kahle | 95/115 |
| 2,899,474 | 8/1959 | Ricards | 95/114 X |
| 3,150,942 | 9/1964 | Vasan | 95/115 |
| 3,221,476 | 12/1965 | Meyer | 95/97 |
| 3,231,512 | 1/1966 | Harter | 96/126 |
| 3,555,787 | 1/1971 | Lustig | 96/124 |
| 3,626,671 | 12/1971 | Ebeling, Jr. | 96/126 |
| 3,734,293 | 5/1973 | Biskis | 96/126 X |
| 4,013,429 | 3/1977 | Sircar et al. | 95/130 X |
| 4,026,680 | 5/1977 | Collins | 95/99 |
| 4,264,340 | 4/1981 | Sircar et al. | 95/130 X |
| 4,539,019 | 9/1985 | Koch | 95/130 X |
| 4,636,225 | 1/1987 | Klein et al. | 95/130 X |
| 4,892,565 | 1/1990 | Schmidt et al. | 55/26 |
| 5,110,569 | 5/1992 | Jain | 95/123 X |
| 5,114,440 | 5/1992 | Reiss | 95/130 X |
| 5,169,413 | 12/1992 | Leavitt | 96/130 X |
| 5,228,888 | 7/1993 | Gmelin et al. | 95/130 X |
| 5,520,721 | 5/1996 | Fraysse et al. | 95/130 X |
| 5,529,610 | 6/1996 | Watson et al. | 95/130 X |

FOREIGN PATENT DOCUMENTS

| | | |
|---|---|---|
| 1940156 | 3/1970 | Germany. |
| 55-061918 | 5/1980 | Japan. |

OTHER PUBLICATIONS

Jun Izumi et al., "High Efficiency Oxygen Separation With the Low Temperature and Low Pressure PSA", Nov. 5–10, 1989, pp. 1–10, 1989 Annual Meeting of AICHE, San Francisco, CA.

*Primary Examiner*—Robert Spitzer
*Attorney, Agent, or Firm*—Coleman R. Reap; Larry R. Cassett

[57] ABSTRACT

In a pressure swing adsorption plant for the production of oxygen enriched gas a pressure vessel contains a first bed of molecular sieve adsorbent located adjacent an outlet 4 of the vessel which has an optimum operating efficiency at approximately ambient temperature and a second bed 10 of molecular sieve adsorbent which has an optimum efficiency below that of ambient operating temperature located adjacent the inlet 2.

18 Claims, 1 Drawing Sheet

“PRESSURE SWING ADSORPTION PLANTS

RELATED APPLICATIONS

This application is a continuation-in-part of application Ser. No. 898,796, filed May 5, 1992, now abandoned.

TECHNICAL FIELD

The present invention relates to the separation of at least one constituent of a feed gas mixture by pressure swing adsorption (PSA) techniques.

BACKGROUND OF THE INVENTION

U.S. Pat. No. 4,026,680 addresses the problem of cold zones which are formed in the pressure vessels of PSA plants, particularly large scale PSA plants for the production of oxygen from feed air where the adsorbent material used is a zeolite molecular sieve.

U.S. Pat. No. 4,026,680 discloses that temperature drops in the order of 100° F. below feed air temperature have been observed at the inlet end of pressure vessels forming part of a PSA plant for the production of oxygen from feed air. Since the molecular sieve material is usually selected to operate best, as regards oxygen recovery efficiency, at ambient conditions, the effect of a cold zone is to reduce the performance of the molecular sieve material.

In order to meet this problem U.S. Pat. No. 4,026,680 teaches the transference of heat within the pressure vessel from the ambient temperature zones to the cold zone by metal solid conduction. The metal solid conduction can take the form of a plurality of metal plates positioned parallel and equidistant from each other and extending through the adsorbent bed such that heat from ambient temperature areas of the pressure vessel is conducted via the metal plates to a cold zone adjacent the inlet to the pressure vessel. In other words, the U.S. Pat. No. 4,026,680 concentrates on warming up the bed of adsorbent material at a location adjacent the inlet of the pressure vessel.

SUMMARY OF THE INVENTION

It is an aim of the present invention to provide means which inhibit the effect of a cold zone in a pressure vessel of a PSA plant by taking advantage of the relatively cold inlet by selecting molecular sieve material having optimum efficiency for gross nitrogen removal at a relatively low temperature and which minimizes the radial temperature gradient adjacent the outlet of the pressure vessel and use there a sieve chosen for optimum efficiency at ambient plant operating temperatures.

According to the present invention an apparatus for the separation of at least one constituent from a feed gas mixture by pressure swing adsorption comprises a pressure vessel having an inlet for the feed gas mixture and an outlet for product gas, a first bed of a molecular sieve adsorbent selected for optimum operational efficiency at ambient temperature and located adjacent the outlet and a second bed of a molecular sieve adsorbent selected for optimum operational efficiency at a temperature below ambient.

In a preferred embodiment the second bed of molecular sieve adsorbent is selected for optimum operational efficiencies at a temperature between −35° to −45° C.

Preferably, a plurality of metal plates are positioned within the first bed each in good thermal contact with an interior surface of the pressure vessel.

Additionally or alternatively, a heater may be arranged within the first bed.

BRIEF DESCRIPTION OF DRAWINGS

Embodiments of the invention will now be described by way of example, reference being made to the Figures of the accompanying diagrammatic drawings in which.

DETAILED DESCRIPTION OF INVENTION

Figure 1:
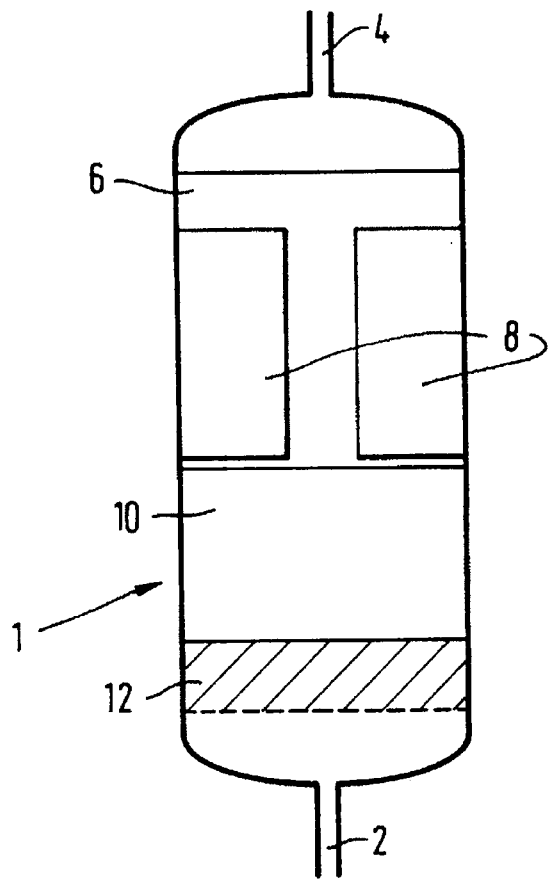
FIG. 1 is a schematic view of a pressure vessel forming part of a pressure swing adsorption plant for the production of oxygen enriched gas from air.

As shown in FIG. 1, a pressure vessel 1 forming part of a pressure swing adsorption plant for the production of an oxygen enriched gas from a feed air stream has an inlet 2 for the feed air stream and an outlet 4 for oxygen enriched gas (product gas).

Adjacent the outlet 4 there is located a first bed 6 of a molecular sieve adsorbent selected for optimum operational efficiency at approximately ambient temperature. The adsorbent used in this first bed may be any of the well known molecular sieves that operate most efficiently for the separation of air into nitrogen-enriched and oxygen-enriched components at ambient temperatures. Examples of suitable adsorbents are calcium-exchanged type X zeolite, strontium-exchanged type X zeolite and calcium-exchanged type A zeolite. The most preferred zeolites for use in the first bed are calcium-exchanged type X zeolite and strontium-exchanged type X zeolite. The most preferred adsorbent for this bed is calcium-exchanged type X zeolite. These sieves and their use in separating air into nitrogen-rich and oxygen-rich components are described in the paper "high Efficiency Oxygen Separation with the Low Temperature and Low Pressure PSA", presented by Izumi et al. at the 1989 Annual Meeting of the American Institute of Chemical Engineers, held in San Francisco, Calif. of Nov. 5–10, 1989, the text of which is incorporated herein by reference.

Positioned within the bed 6 are a plurality of metal plates 8 each in good thermal contact with the interior surface of the pressure vessel 1. As shown, the plates 8 are arranged in a plane parallel with the longitudinal axis of the bed 6.

Adjacent the inlet 2 there is located a second bed 10 of a molecular sieve adsorbent selected for optimum operating efficiency at a temperature below ambient temperature. The molecular sieve forming the second bed 10 will have an optimum operational efficiency between −35° to −45° C. and preferably approximately −40° C. The adsorbent used in this bed can be any molecular sieve that operates most efficiently at temperatures falling within this temperature range. A preferred adsorbent for use in the second bed is sodium type X zeolite, the use of which is also described in the above-referenced Izumi et al. paper.

Between the bed 10 and the inlet 2 there is located an alumina layer 12. In use, during the adsorption mode of the pressure vessel 1, feed air enters the pressure vessel 1 at inlet 2. The alumina layer 12 removes water vapor and possibly some carbon dioxide thereby allowing the remaining air to pass through the bed 10 where nitrogen is adsorbed from the air.

Finally, the oxygen enriched gas passing from the bed 10 then enters the bed 6 where most of the last few percent of nitrogen is removed. The product gas then leaves the pressure vessel 1 via the outlet 4.

It will be apparent that adjacent the inlet 2 where the cold zone is found the bed 10 will most efficiently remove the nitrogen from the air feed mixture. At the upper (as shown) end of the pressure vessel adjacent the outlet 4 where the temperature is likely to be around ambient, the bed 6 will more efficiently remove substantially all the remaining nitrogen.

The effect of the plates 8 is to minimize the radial temperature gradient at the pressure vessel ambient temperature to minimize the nitrogen adsorption front length in bed 6.

Figure 2:
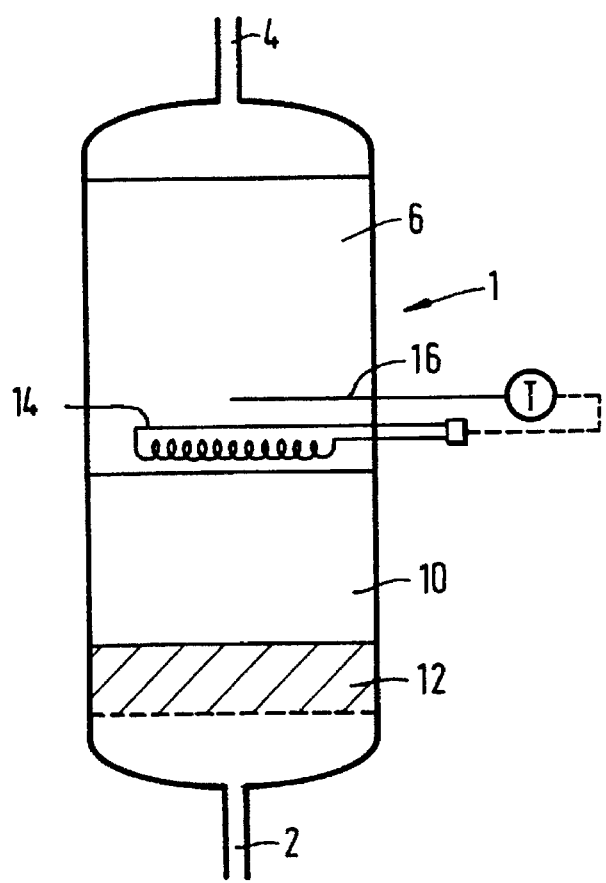
FIG. 2 is a similar schematic view of a further pressure vessel forming part of a pressure swing adsorption plant for the production of oxygen enriched gas from air.

Referring now to FIG. 2 where like reference numerals denote like structure; as before the pressure vessel 1 includes an inlet 2 for the feed air stream and an outlet 4 for product gas. Adjacent the outlet 4 there is located a first bed 6 of a molecular sieve adsorbent selected for optimum operating efficiency at approximately ambient temperature and adjacent the inlet 2 there is located a second bed 10 of a molecular sieve adsorbent selected for optimum operative efficiency at a temperature below ambient temperature. Between the bed 10 and the inlet 2 is an alumina layer 12.

In this embodiment the plurality of plates 8 are replaced by a heater 14 arranged within the bed 6 which is electrically connected to and controlled by a temperature sensor 16 also located within the first bed 6.

The operation of the pressure vessel 1 in the adsorbent mode is as previously described but the heater electrically linked to the temperature sensor permits control of the temperature within the bed 6. The use of the heater and the temperature sensor also helps to reduce any change of performance during the starting up period of the pressure vessel 1.

It will be evident that the heater and the temperature sensor could be combined with the plates 8 in controlling the radial temperature gradient within the bed 6.

In the above described embodiments advantage is taken of the cold spots adjacent the inlet 2 of the pressure vessel 1 by selecting a molecular sieve material which has an optimum efficiency at low temperatures in the order of −40° C. for the gross nitrogen removal adjacent the inlet 2 and concentrates on minimizing radial temperature gradient at the bed 6 adjacent the outlet 4 using there a molecular sieve material chosen for maximum efficiency of operation at about plant ambient temperature.

I claim:

1. A process for separating at least one constituent from a gas mixture by pressure swing adsorption comprising passing said mixture through a layer of alumina, then through a first bed of molecular sieve adsorbent selected for optimum operational efficiency at a temperature below ambient and then through a second bed of molecular sieve adsorbent selected for optimum operational efficiency at ambient temperature.

2. The process of claim 1, wherein said at least one constituent is nitrogen and said gas mixture is air.

3. The process of claim 2, wherein said first bed of molecular sieve adsorbent and said second bed of molecular sieve adsorbent comprise nitrogen-selective adsorbents.

4. The process of claim 2, wherein said first bed of molecular sieve adsorbent comprises sodium type X zeolite.

5. The process of claim 2 or claim 4, wherein said second bed of molecular sieve comprises a member selected from the group consisting of calcium-exchanged type X zeolite, strontium-exchanged type X zeolite, calcium-exchanged type A zeolite and mixtures of these.

6. The process of claim 5, wherein said second bed comprises calcium-exchanged type X zeolite.

7. A process for separating nitrogen from air by pressure swing adsorption comprising passing air from which water vapor has been removed through a vessel containing a first bed of nitrogen-selective molecular sieve adsorbent selected for optimum operational efficiency at a temperature below ambient and them through a second bed of nitrogen-selective molecular sieve adsorbent selected for optimum operational efficiency at ambient temperature.

8. A process for separating nitrogen from air in a vessel by pressure swing adsorption comprising passing air from which water vapor has been removed through a first bed of adsorbent comprising sodium type X zeolite at a temperature below ambient and then through a second bed of adsorbent comprising a member selected from the group consisting of calcium-exchanged type X zeolite, strontium-exchanged type X zeolite, calcium-exchanged type A zeolite and mixtures of these at ambient temperature, said first and second beds of adsorbent being contained in one vessel.

9. Apparatus for the separation of at least one constituent from a feed gas mixture by pressure swing adsorption comprising a pressure vessel having an inlet for the feed gas mixture and an outlet for product gas, said pressure vessel containing a layer of alumina adjacent said inlet, a first bed of molecular sieve adsorbent selected for optimum operational efficiency at ambient temperature and located adjacent said outlet, and a second bed of molecular sieve adsorbent selected for optimum operational efficiency at a temperature below ambient temperature and located between said layer of alumina and said first bed of molecular sieve adsorbent.

10. The apparatus of claim 9, wherein said at least one constituent is nitrogen and said gas mixture is air.

11. The apparatus of claim 10, wherein said first bed of molecular sieve adsorbent and said second bed of molecular sieve adsorbent comprise nitrogen-selective adsorbents.

12. The apparatus of claim 10, wherein said second bed of molecular sieve adsorbent comprises sodium type X zeolite.

13. The apparatus of claim 12, wherein said first bed of molecular sieve comprises calcium-exchanged type X zeolite.

14. The apparatus of claim 10 or 12, wherein said first bed of molecular sieve comprises an adsorbent selected from the group consisting of calcium-exchanged type X zeolite, strontium-exchanged type X zeolite, calcium-exchanged type A zeolite and mixtures of these.

15. The apparatus of claim 9, wherein a plurality of metal plates are positioned within the first bed each in good thermal contact with an interior surface of said pressure vessel.

16. The apparatus of claim 15, wherein each metal plate is arranged in a plane parallel to the axis of said first bed.

17. The apparatus of claim 9, wherein a heater is arranged in said first bed.

18. The apparatus of claim 17, wherein said heater is electrically connected to and controlled by a temperature sensor located within said first bed.

* * * * *